United States Patent
Fibaek (10) Patent No.: US 11,327,575 B2
(45) Date of Patent: May 10, 2022

(54) METHODS AND SYSTEMS FOR POSITIONING AND CONTROLLING SOUND IMAGES IN THREE-DIMENSIONAL SPACE

(71) Applicant: Blackmagic Design Pty Ltd, Port Melbourne (AU)

(72) Inventor: Tino Fibaek, Frenchs Forest (AU)

(73) Assignee: Blackmagic Design Pty Ltd

( * ) Notice: Subject to any disclaimer, the term of this patent is extended or adjusted under 35 U.S.C. 154(b) by 0 days.

(21) Appl. No.: 15/506,499

(22) PCT Filed: Aug. 26, 2015

(86) PCT No.: PCT/AU2015/050492
§ 371 (c)(1),
(2) Date: Feb. 24, 2017

(87) PCT Pub. No.: WO2016/029264
PCT Pub. Date: Mar. 3, 2016

(65) Prior Publication Data
US 2017/0262075 A1    Sep. 14, 2017

(30) Foreign Application Priority Data
Aug. 26, 2014  (AU) ............................... 2014903381

(51) Int. Cl.
*G06F 3/01*     (2006.01)
*G06F 3/0346*   (2013.01)
*G06F 3/16*     (2006.01)

(52) U.S. Cl.
CPC ............ *G06F 3/0346* (2013.01); *G06F 3/017* (2013.01); *G06F 3/165* (2013.01)

(58) Field of Classification Search
None
See application file for complete search history.

(56) References Cited

U.S. PATENT DOCUMENTS 8,068,105 B1   11/2011  Classen
8,255,069 B2   8/2012   Evans et al.
(Continued)

FOREIGN PATENT DOCUMENTS

JP    H0990963 A    4/1997

OTHER PUBLICATIONS

"3D Audio Workspace explained". Resolution. vol. 13.7. Nov./Dec. 2014. ISSN 1477-4216. pp 48-49. [retrieved from internet on Nov. 2 & 5, 2015] URL : http://www.resolutionmag.com/back-issues-content/81_content. pdf >URL : http://www.fairlight.com.au/wp-content/uploads/20 I4/06/3DA W-inResolution_web.pdf >.
International Search Report for PCT/AU2015/050492, 7 pps, dated Nov. 10, 2015.
Written Opinion of the International Searching Authority, PCT/AU2015/050492, 6 pps, dated Nov. 15, 2015.
(Continued)

*Primary Examiner* — Kent W Chang
*Assistant Examiner* — Benjamin Morales
(74) *Attorney, Agent, or Firm* — Lerner, David, Littenberg, Krumholz & Mentlik, LLP (57) ABSTRACT

A system for positioning and controlling sound images in three-dimensional space, comprising: a three-dimensional motion sensing input device; and a computer system incorporating a digital audio workstation application including a gesture library and one or more built-in features, the computer system being connected to the three-dimensional motion sensing input device by a communication link, wherein gestures that are pre-defined in the gesture library are captured by the three-dimensional motion sensing input device and are provided to the computer system via the communication link and used by the digital audio workstation application to position a sound image in three-dimensional space or to control one or more built-in features of the digital audio workstation application.

10 Claims, 4 Drawing Sheets

(56) References Cited

U.S. PATENT DOCUMENTS

| | | | |
|---|---|---|---|
| 8,448,083 B1* | 5/2013 | Migos | G06F 3/04883 345/671 |
| 8,638,989 B2 | 1/2014 | Holz | |
| 2009/0303231 A1* | 12/2009 | Robinet | G06F 3/04815 345/419 |
| 2013/0167026 A1* | 6/2013 | Shafer | G06F 3/0484 715/716 |
| 2014/0201666 A1 | 7/2014 | Bedikian et al. | |
| 2014/0240231 A1* | 8/2014 | Minnen | G06F 3/017 345/158 |
| 2014/0355789 A1* | 12/2014 | Bohrarper | H04N 21/4661 381/119 |
| 2015/0116200 A1* | 4/2015 | Kurosawa | G06K 9/00355 345/156 |
| 2015/0149929 A1* | 5/2015 | Shepherd | H04L 65/403 715/753 |
| 2015/0179186 A1* | 6/2015 | Swierk | G06F 3/167 704/276 |
| 2016/0357262 A1* | 12/2016 | Ansari | G06F 3/017 |
| 2017/0161014 A1* | 6/2017 | Kikugawa | G06F 3/165 |

OTHER PUBLICATIONS

LeapMotion Control, [retrieved from internet, Feb. 23, 2017], https://www.leapmotion.com/, 6 pages.

Microsoft's Kinect, [retrieved from internet, Feb. 23, 2017], http://www.microsoft.com/en-US/kinectforwindows/, 7 pages.

Churnside, et al., "Musical Movements—Gesture Based Audio Interfaces," Audio Engineering Society Convention Paper 8496, Presented at the 131st Convention Oct. 20-23, 2011, New York, NY, pp. 1-10.

Fan, et al., "Move That Sound There: Exploring Sound in Space with a Markerless Gestural Interface," Leonardo Music Journal, Dec. 31, 2013, pp. 31-32, vol. 23.

Fohl, et al., "A Gesture Control Interface for a Wave Field Synthesis System." In NIME, May 28, 2013, pp. 341-346.

Marshall, et al., "On the Development of a System for Gesture Control of Spatialization," Proceedings of the 2006 International Computer Music Conference, Nov. 6-11, 2006, New Orlelans, USA.

Okamoto, et al., "Sound Image Rendering System for Headphones," IEEE Transactions on Consumer Electronics, Aug. 3, 1997, pp. 689-693, vol. 43, No. 3.

* cited by examiner

METHODS AND SYSTEMS FOR POSITIONING AND CONTROLLING SOUND IMAGES IN THREE-DIMENSIONAL SPACE

CROSS-REFERENCE TO RELATED APPLICATION

The present application is a national phase entry under 35 U.S.C. § 371 of International Application No. PCT/AU2015/050492 filed Aug. 26, 2015, which claims priority from Australian Application No. 2014903381 filed Aug. 26, 2014, all of which are hereby incorporated herein by reference.

FIELD OF THE INVENTION

The invention relates to methods and systems for positioning and controlling sound images in three-dimensional space. The invention is generally applicable to the field of media production, including audio, video, film and multimedia production.

BACKGROUND OF THE INVENTION

Media production involving the positioning and control of sound images in three-dimensional space is becoming increasingly sophisticated involving a vast array of features and functions. However, the actual static and dynamic positioning and control of sound images in three-dimensional space is typically driven by mouse, keyboard and other peripherals. Such traditional controllers can only provide an operator with a limited sense of depth in relation to positioning and controlling sound images in three-dimensional space.

Accordingly, with increasing functionality, particularly in complex and high-throughput situations, there is a continued need to provide improved systems and methods for positioning and controlling sound images in three-dimensional space.

It is an object of the present invention to substantially overcome or at least ameliorate one or more of the disadvantages of the prior art.

SUMMARY OF THE INVENTION

In an aspect, there is provided a system for positioning and controlling sound images in three-dimensional space. Such a system may comprise:
 a three-dimensional motion sensing input device;
 a computer system incorporating a digital audio workstation application including a gesture library and one or more built-in features, the computer system being connected to the three-dimensional motion sensing input device by a communication link,
 wherein gestures that are pre-defined in the gesture library are captured by the three-dimensional motion sensing input device and are provided to the computer system via the communication link and used by the digital audio workstation application to position a sound image in three-dimensional space or to control one or more built-in features of the digital audio workstation application.

An alternate system according to this aspect may comprise:
 a three-dimensional motion sensing input device;
 a master computer system connected to the three-dimensional motion sensing input device by a communication link;
 one or more additional computer system(s) network connected to the master computer system by communication link(s),
 wherein each computer system incorporates a digital audio workstation application including a gesture library and one or more built-in features, and
 gestures that are pre-defined in the gesture library are captured by the three-dimensional motion sensing input device and are provided to the master computer system via the communication link and are able to be used by the digital audio workstation application of any of the computer systems to position a sound image in three-dimensional space or to control one or more built-in features of the digital audio workstation application.

In such an alternate system, there may be five (5) or more additional computer systems network connected to the master computer system by communication links.

In another aspect, there is provided a method for positioning sound images in three-dimensional space. Such a method may comprise:
 using pre-defined gestures able to be detected by a three-dimensional motion sensing input device to position a sound image in three-dimensional space or control one or more built-in features of a digital audio workstation application located on a computer system which is connected to three-dimensional motion sensing input device via a communication link.

BRIEF DESCRIPTION OF THE DRAWINGS

Preferred embodiments of the invention will now be described with reference to the accompanying drawings wherein.

DESCRIPTION OF THE PREFERRED EMBODIMENTS

A preferred embodiment involves the use of a three-dimensional motion sensing input device, for example, the LeapMotion Control (see https://www.leapmotion.com/ last accessed on 21 Aug. 2015) or Microsoft's Kinect (see http://www.microsoft.com/en-us/kinectforwindows/ last accessed 21 Aug. 2015) as a controller connected to a computer system running a digital audio workstation application for positioning and controlling sound images in three-dimensional space.

Figure 2:
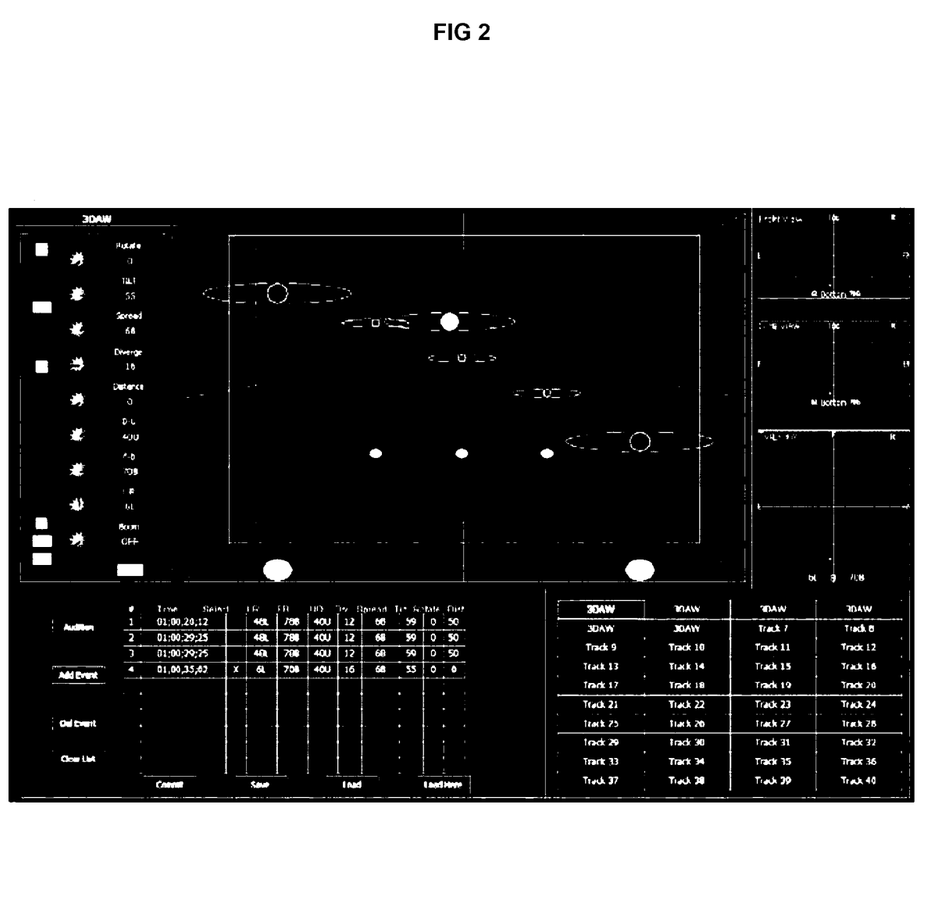

A computer system running a digital audio workstation application typically may comprise or be connected to a display. As seen in the example depicted in FIG. 2, the display may present a representation of a three-dimensional space, typically a 'virtual room'. In FIG. 2, sound images are represented by 'balls'. To position a sound image within this space in accordance with a preferred embodiment, the user may engage the desired function on the digital audio workstation running on the computer system, for example, a pan function, and then reaches out with their hand into the detection zone of the three-dimensional motion sensing input device connected to the computer system. A graphical feature may show the user's hand within the virtual room on the display. The user may then simply reach and grab a 'ball' to move it in three-dimensions within the virtual room. Alternative to the display of a graphical feature of or approximating the user's hand, a graphical feature may highlight a ball when the user's hand is able to select for example, a pinching motion, making a fist, or a keyboard stroke. A single hand may be used to control one audio object, or two hands may control two independent signals at the same time.

Modifiers may be implemented, for example, via a keyboard, that modifies the behaviour of the control to other functions, such as:

"Lock to POI" restricting the movement to points of interest, for example, to loudspeaker positions, or to specific planes;

"Rotate" switching the sensing to control of the sound image rather than the position, enabling rotation of the sound image by responding to twisting motions of the hand;

"Tilt" may switch the sensing to control of the sound image rather than the position, enabling tilt of the sound image, by responding to titling motions of the hand;

"Spread" may allow control of sound image size, by responding to the hand/finders opening and closing;

"Divergence" may allow control of sound image spill, by responding to the hand/finders opening and closing.

Figure 1A:
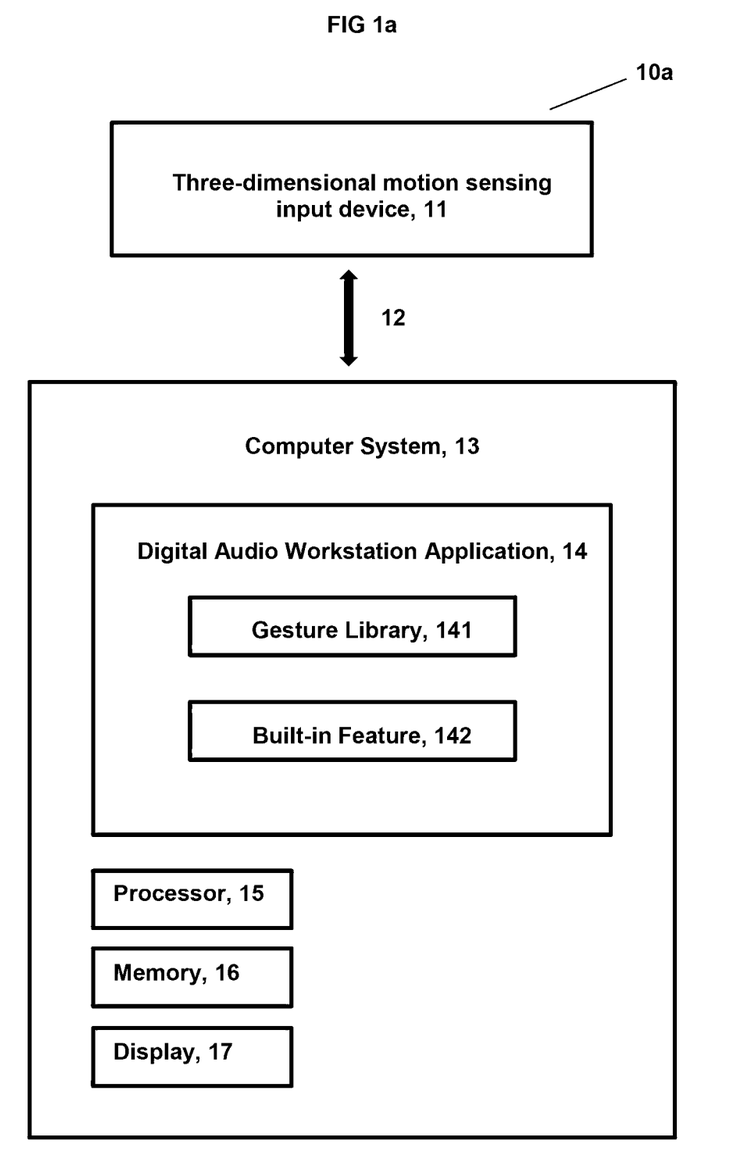
FIG. 1a depicts an example block diagram of a system for positioning and controlling sound images in three-dimensional space in accordance with a preferred embodiment.
Figure 1B:
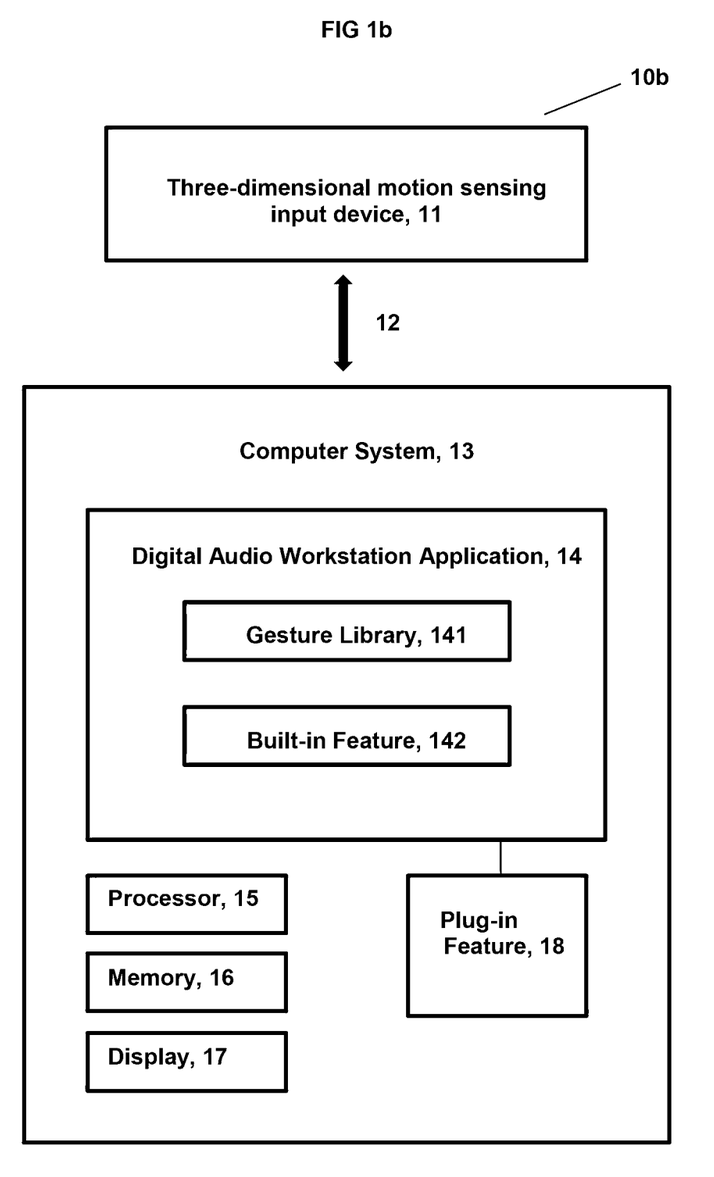
FIG. 1b depicts an example block diagram of a system for positioning and controlling sound images in three-dimensional space in accordance with another preferred embodiment.
Figure 1C:
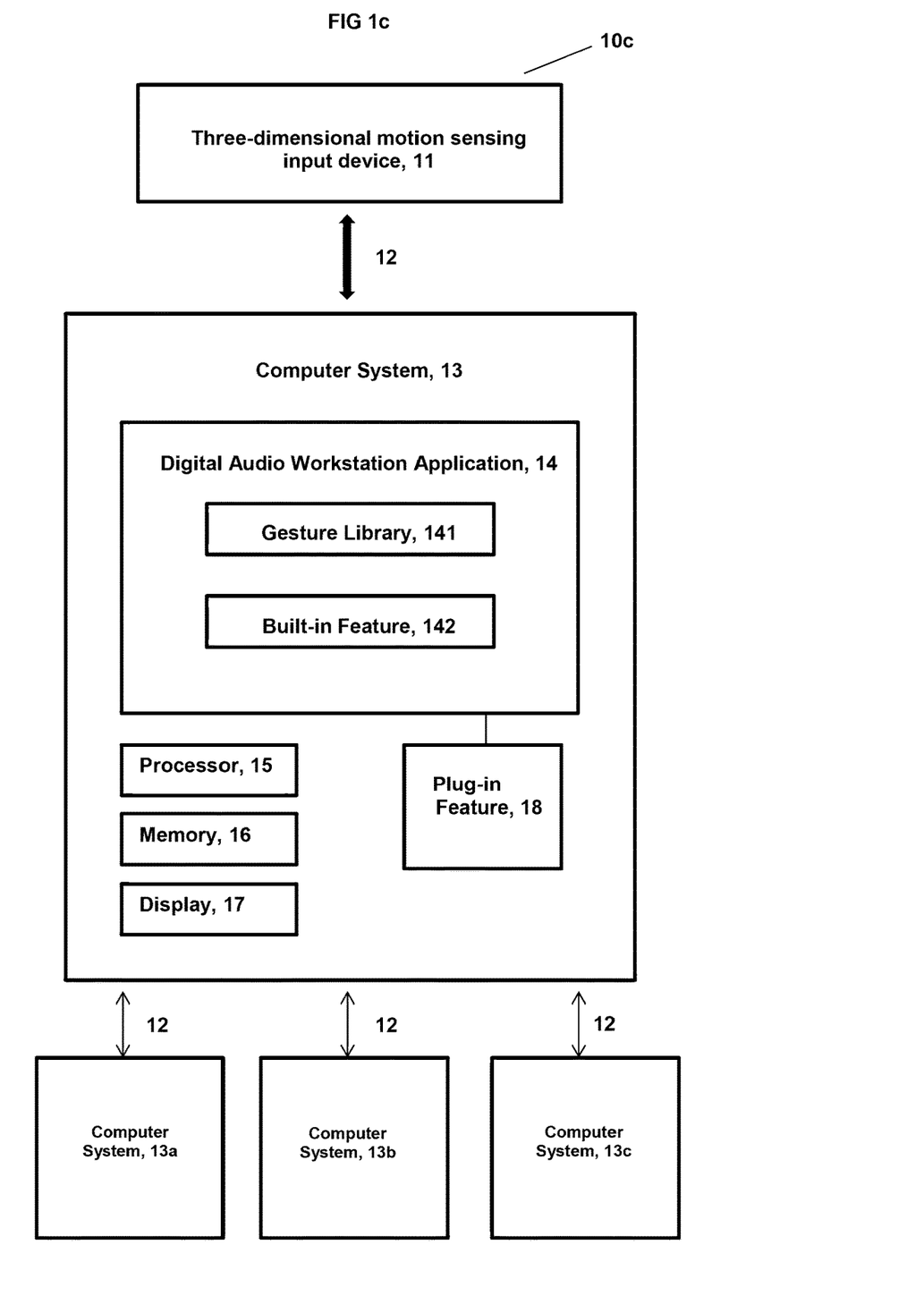
FIG. 1c depicts an example block diagram of a system for positioning and controlling sound images in three-dimensional space in accordance with a further preferred embodiment; and, FIG. 2 depicts a screen-shot of a display showing a three-dimensional representation of a virtual room with balls on the display representing sound images.

Referring to FIGS. 1a through 1c, systems for positioning and controlling sound images in three-dimensional space in accordance with preferred embodiments are depicted comprising a three-dimensional motion sensing input device 11 in communication with a computer system 13 incorporating a digital audio workstation application 143 via a communication link 12. The communication link 12 may be a wired and/or a wireless connection. Where the communication link 12 is wired it may be a USB connection. The communication link 12 may be direct or indirect. The communication link 12 may comprise a form of translation application and/or plug-in. The three-dimensional motion sensing input device 11 captures information in relation to motion taking place in its detection zone. The three-dimensional motion sensing input device 11 provides the information it has captured to the computer system 13 incorporating a digital audio workstation application 14 via the communication link 12.

The computer system 13 incorporates a digital audio workstation application 14, processor 15, memory 16 and a display 17. The processor 15 may execute instructions which are stored in memory 16 to provide audio-video output signals to the display 17 and to achieve other functionality. The digital audio workstation application 14 may take the form of an audio production software platform such as, for example, Fairlight Dream II, Nuendo or ProTools. The digital audio workstation application may comprise a gesture library 141 and one or more built-in features 142 for audio production, for example, a panning function. As seen in FIGS. 1b and 1c, the architecture of the digital audio workstation application 14 may be configured for use of a plug-in feature 18 for audio production, for example, an alternate panning function not included in the digital audio workstation application 14.

The digital audio workstation application may include a gesture library 141, such as a collection of gesture filters, each having information concerning a gesture that may be performed (as the user moves). For example, a gesture filter can be provided for various hand gestures, such as swiping or flinging of the hands. By comparing a detected motion to each filter, a specified gesture or movement which is performed by a person may be identified. An extent to which the movement is performed may also be determined. Information captured by the three-dimensional motion sensing input device 11 and provided to the computer system 13 via the communication link 12 may be pre-defined in the gesture library 141 to control one or more built-in features 142 of the digital audio workstation application.

Referring to FIG. 1c, the computer system 13 may be network connected to other computer systems 13a, 13b and 13c via a communication link 12. Such a network connection may enable the three-dimensional motion sensing input device 11 to control one or more built-in features of the digital audio workstation application and/or plug-in features of the network connected computer systems 13a, 13b and 13c via the digital audio workstation application 14 of the computer system 13. In such an arrangement, digital audio work station 13 is able to position and control sound images in three-dimensional space that are otherwise being produced at physically separated computer systems. In preferred embodiments, computer system 13 may be network connected to between five and twelve physically separated computer systems.

The three dimensional motion sensing input device of preferred embodiments of the present invention may be any conventional three dimensional motion sensing input device capable of detecting an intuitive or a predefined gesture of a user and that is capable of recognizing the gesture as being, for example, a selecting gesture, a grabbing gesture, a throwing gesture, or the like. Examples of suitable three dimension sensing input devices currently in available are the Microsoft Kinect and the Leap Motion three dimensional input sensing devices.

In preferred embodiments, the three dimensional motion sensing input device may be incorporated into another network component, such as a mobile device or a personal computer, or may be a stand-alone device in the network, such as a wall-mounted, desktop or free-standing device. Additionally, the three dimensional motion sensing input device may be any suitable distance from, and may have any orientation to, a user, a user's gesture, or to any network component, including any virtual component or cloud resource. A suitable distance may include a small distance, such as millimetres, or a large distance, such as any distance over which the three dimensional motion sensing input device remains capable of accurately obtaining sufficient gesture information. A suitable orientation may include any orientation, such as an orthogonal orientation, a perpendicular orientation, an aerial orientation, or any other orientation.

In preferred embodiments, the three dimensional motion sensing input device may be configured to recognize a gesture that is a multi-part gesture or a gesture that is partially delayed in time. For example, the three dimensional motion sensing input device may recognize a grab and throw gesture even when the grab gesture is performed some time prior to, and separate in time from, the throw gesture.

In preferred embodiments, the system may be calibrated prior to use in order for the system to be capable of accurately detecting a particular gesture or a particular user. System calibration may also aid the system in extrapolating the orientation, distance and/or direction of network devices and components from one another and/or the user.

This specification is written to a person of ordinary skill in the art of media processing, computer architecture, and programming.

Unless specifically stated otherwise, throughout the specification discussions utilizing terms such as "processing", "computing", "calculating", "determining" or the like, refer to the action and/or processes of a computer or computing system, or similar electronic computing device, that manipulates, and/or transforms data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Each processor may include one or more CPUs, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries computer-readable instructions, e.g., software, for performing, when executed by the processing system, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute carrier medium carrying computer-readable instructions.

Note that while some diagram(s) only show(s) a single processor and a single memory that carries the computer-readable instructions, those in the art will understand that many of the components described above are included, but not explicitly shown or described in order not to obscure the inventive aspect.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Although preferred forms of the present invention have been described with particular reference to applications in relation to audio production, it will be apparent to persons skilled in the art that modifications can be made to the preferred embodiments described above or that the invention can be embodied in other forms and used in alternative applications.

Throughout this specification and the claims which follow, unless the context requires otherwise, the words "incorporate" and "comprise", and variations such as "incorporates", "incorporating", "comprises" and "comprising", will be understood to imply the inclusion of a stated integer or step or group of integers or steps, but not the exclusion of any other integer or step or group of integers or steps.

The reference in this specification to any prior publication (or information derived from it), or to any matter which is known is not, and should not be taken as an acknowledgment or admission or any form of suggestion that that prior publication (or information derived from it) or known matter forms part of the common general knowledge in the field of endeavour to which this specification relates.

The invention claimed is:

1. A system for positioning and controlling sound images in three-dimensional space, the system comprising:
   a three-dimensional motion sensing input device configured to capture user gesture information associated with a gesture performed by a user;
   a computer system incorporating a digital audio workstation application including a gesture library, the computer system being connected to the three-dimensional motion sensing input device by a communication link;
   gesture library comprising one or more gesture filters, each gesture filter comprising gesture information associated with a respective gesture;
   wherein the three-dimensional motion sensing input device is configured to provide captured user gesture information to the computer system via the communication link;
wherein the digital audio workstation application is configured to:
   visually represent a three-dimensional space on a display connected to the computer system as a virtual room;
   compare the captured user gesture information with at least one of the one or more gesture filters to identify the gesture; and
   based on the identified gesture, position and control a representation of a sound image in the virtual room to thereby position and control an associated sound image in three-dimensional space;
wherein positioning and controlling the representation of the sound image comprises:
   (i) movement of the representation of the sound image to a point of interest based on the identified gesture; or
   (ii) rotation and/or tilting the representation of the sound image based on the identified gesture; or
   (iii) control sound image size or sound image spill based on the identified gesture.

2. The system of claim 1, further comprising:
   one or more additional computer system(s) network connected to the computer system by communication link(s);
   wherein each of the one or more additional computer system incorporates a respective digital audio workstation application including a gesture library and one or more built-in features, and wherein the one or more additional computer systems is configured to access the captured user gesture provided to the computer system via the communication link; and wherein the digital audio workstation application of any one of the one or more additional of the computer systems, based on the captured user gesture information, is configured to:

visually represent the three-dimensional space on the display connected to the computer system as the virtual room;

compare the captured user gesture information with at least one of the one or more gesture filters to identify the gesture; and based on the identified gesture, position and control the representation of the sound image in the virtual room to thereby control an associated sound image in three-dimensional space;

wherein positioning and controlling the representation of the sound image comprises:
(i) movement of the representation of the sound image to a point of interest based on the identified gesture; or
(ii) rotation and/or tilting the representation of the sound image based on the identified gesture; or
(iii) control sound image size or sound image spill based on the identified gesture.

3. The system of claim 2, wherein there are five or more additional computer systems network connected to the computer system by communication links.

4. The system of claim 1, wherein the three dimensional motion sensing input device is further configured to capture user movement information associated with an extent of movement by a user and to provide the user movement information to the computer system via the communication link; and wherein the digital audio workstation application is further configured, based on the user movement information, to position and control the representation of the sound image in the virtual room to thereby control the associated sound image in three-dimensional space.

5. A method for positioning sound images in three dimensional space, the method comprising:

capturing, using a three-dimensional motion sensing input device, user gesture information associated with a gesture performed by a user;

providing the user gesture information to a computer system via a communications link, the computer system incorporating a digital audio workstation application including a gesture library, wherein the gesture library comprises one or more gesture filters, each gesture filter comprising gesture information associated with a respective gesture;

visually representing, by the digital audio workstation, a three-dimensional space on a display connected to the computer system as a virtual room;

comparing, by the digital audio workstation application, the captured user gesture information with at least one of the one or more gesture filters to identify the gesture;

based on the identified gesture, positioning and controlling a representation of the sound image in the virtual room to thereby control an associated sound image in three-dimensional space;

wherein positioning and controlling the representation of the sound image comprises:
(i) movement of the representation of the sound image to a point of interest based on the identified gesture; or
(ii) rotation and/or tilting the representation of the sound image based on the identified gesture; or
(iii) control sound image size or sound image spill based on the identified gesture.

6. The method of claim 5, further comprising:
accessing, by one or more additional computer system(s) network connected to the computer system by communication link(s), the captured user gesture information provided to the computer system via the communication link, wherein each of the one or more additional computer system incorporates a respective digital audio workstation application including a gesture library and one or more built-in features; and positioning, by the digital audio workstation application of any one of the one or more additional of the computer systems, the representation of the sound image in the virtual room to thereby control an associated sound image in three-dimensional space based on the captured user gesture information.

7. The method of claim 5, further comprising:
accessing, by one or more additional computer system(s) network connected to the computer system by communication link(s), the captured user gesture information provided to the computer system via the communication link, wherein each of the one or more additional computer system incorporates a respective digital audio workstation application including a gesture library and one or more built-in features; and controlling, by the digital audio workstation application of any one of the one or more additional of the computer systems, one or more built-in features of the digital audio workstation application.

8. The method of claim 5, further comprising:
capturing, by the three-dimensional motion sensing input device, user movement information associated with an extent of movement by a user;

providing, by the three-dimensional motion sensing input device, the user movement information to the computer system via the communication link; and positioning, by the digital audio workstation application, the representation of the sound image in the virtual room to thereby control an associated sound image in three-dimensional space based on the user movement information.

9. The method of claim 5, further comprising:
capturing, by the three-dimensional motion sensing input device, user movement information associated with an extent of movement by a user;

providing, by the three-dimensional motion sensing input device, the user movement information to the computer system via the communication link; and controlling, by the digital audio workstation application, one or more built-in features of the digital audio workstation application based on the user movement information.

10. A system for positioning and controlling sound images in three-dimensional space, the system comprising:
a three-dimensional motion sensing input device configured to capture user gesture information associated with a gesture performed by a user;

a computer system incorporating a digital audio workstation application including a gesture library, the computer system being connected to the three-dimensional motion sensing input device by a communication link;

gesture library comprising one or more gesture filters, each gesture filter comprising gesture information associated with a respective gesture;

wherein the three-dimensional motion sensing input device is configured to provide captured user gesture information to the computer system via the communication link;

wherein the digital audio workstation application is configured to:

visually represent a three-dimensional space on a display connected to the computer system as a virtual room;

compare the captured user gesture information with at least one of the one or more gesture filters to identify the gesture; and based on the identified gesture, position and control a representation of a sound image in the virtual room to thereby position and control an associated sound image in three-dimensional space; wherein positioning and controlling the sound image comprises controlling sound image spill based on the identified gesture.

* * * * *